United States Patent [19]

Labinov et al.

[11] Patent Number: 5,392,606

[45] Date of Patent: Feb. 28, 1995

[54] SELF-CONTAINED SMALL UTILITY SYSTEM

[75] Inventors: Solomon D. Labinov; James R. Sand, both of Oak Ridge, Tenn.

[73] Assignee: Martin Marietta Energy Systems, Inc., Oak Ridge, Tenn.

[21] Appl. No.: 199,117

[22] Filed: Feb. 22, 1994

[51] Int. Cl.[6] .................. F25D 5/00; F01K 25/06; F01K 23/02

[52] U.S. Cl. .................................. 60/673; 60/653; 62/87; 62/402

[58] Field of Search ............ 60/673, 649, 653; 165/104.12; 62/87, 116, 112, 402

[56] References Cited

U.S. PATENT DOCUMENTS

| Re. 31,697 | 10/1984 | Gomberg et al. | 60/649 |
|---|---|---|---|
| 2,453,886 | 11/1948 | Ackeret | 60/649 |
| 3,006,146 | 10/1961 | Jackson | 60/649 |
| 3,153,442 | 10/1964 | Silvern | 62/238.4 |
| 3,194,026 | 7/1965 | LaFleur | 62/238.4 |
| 3,196,631 | 7/1965 | Holland | 62/238.4 |
| 3,259,176 | 7/1966 | Rice et al. | 62/238.4 |
| 3,394,555 | 7/1968 | LaFleur | 62/238.4 |
| 3,508,399 | 4/1970 | Pacault et al. | 60/649 |
| 3,568,438 | 3/1971 | Meienberg | 60/673 |
| 4,009,575 | 3/1977 | Hartman, Jr. et al. | 60/673 |
| 4,118,934 | 10/1978 | Brola | 62/238.4 |
| 4,273,743 | 6/1981 | Barber et al. | 60/649 |
| 4,439,988 | 4/1984 | Minardi et al. | 60/649 |
| 4,701,199 | 10/1987 | Kabe et al. | 62/4 |
| 4,732,005 | 3/1988 | Kalina | 60/673 |
| 5,029,444 | 7/1991 | Kalina | 60/673 |

OTHER PUBLICATIONS

Excerpt from *Cryocoolers, Part 1: Fundamentals,* Plenun Press, N.Y/, 1983, p. 52.

Ibrahim, M. B., and Kovach, R. M., "Kalina Cycle Application for Power Generation," (Abs.), 1991.

Kalina, A. E., "Kalina Cycles and Systems for Direct-Fired Power Plants," ASME Industrial and Environmental Applications, 1991.

Excerpt from *Encyclopedia of Chemical Technology,* 3rd Ed., V. 9, pp. 37, 38.

Primary Examiner—Ira S. Lazarus
Assistant Examiner—L. Heyman
Attorney, Agent, or Firm—Luedeka, Neely & Graham

[57] ABSTRACT

A method and apparatus is disclosed to provide a fuel efficient source of readily converted energy to an isolated or remote energy consumption facility. External heat from any of a large variety of sources is converted to an electrical, mechanical, heat or cooling form of energy. A polyatomic working fluid energized by external heat sources is dissociated to a higher gaseous energy state for expansion through a turbine prime mover. The working fluid discharge from the turbine prime mover is routed to a recuperative heat exchanger for exothermic recombination reaction heat transfer to working fluid discharged from the compressor segment of the thermodynaic cycle discharge. The heated compressor discharge fluid is thereafter further heated by the external heat source to the initial higher energy state. Under the pressure at the turbine outlet, the working fluid goes out from a recuperative heat exchanger to a superheated vapor heat exchanger where it is cooled by ambient medium down to an initial temperature of condensation. Thereafter, the working fluid is condensed to a complete liquid state in a condenser cooled by an external medium. This liquid is expanded isenthalpically down to the lowest pressure of the cycle. Under this pressure, the working fluid is evaporated to the superheated vapor state of the inlet of a compressor.

12 Claims, 2 Drawing Sheets

SELF-CONTAINED SMALL UTILITY SYSTEM

BACKGROUND OF THE INVENTION

The U.S. Government has a paid-up license in this invention and the right in limited circumstances to require the patent owner to license others on reasonable terms as provided for by the terms of contract No. Sub. 80X-SL416V under DE-AC05-840R21400.

The present invention relates to closed fluid cycle energy generation systems driven by externally fueled heat sources.

Although densely populated areas of industrialized nations are efficiently served by public and quasi-public utility energy suppliers of electricity and fuel gas, most of the habitable rural regions of the earth remain unserved and with dim prospects for service in the reasonably foreseeable future. Where economically justified, these needs are presently served by portable, internal combustion engine driven generator units fueled by highly refined fossil fuels. The relative expense of these fuels, however, severely limits the use and economic justification of such units.

Most parts of the humanly habitable world have access to indigenous fuel sources such as wood, biomass methane, solar and geothermal. However, the variety of fuel types and specific heats defy any standards for the manufacture of equipment suitable to utilize these diverse fuels.

It is, therefore, an object of the present invention to provide an apparatus for producing useable energy forms such as electrical and/or rotary mechanical and/or space or water heating and/or comfort cooling that is inexpensively adaptable to any type of solid, liquid or gaseous fuel source including geothermal, solar and nuclear sources.

Another object of the present invention is a relatively small energy generation station capable of an unusually high thermal efficiency.

Another object of the present invention is to provide a point of use power generation facility having an unusually high fuel efficiency to remote consumption facilities.

Another object of the present invention is to provide a totally self-contained energy generation system suitable for operation with biomass generated methane, solar incidence and nuclear fuel sources.

SUMMARY

The present invention is constructed to accomplish these and other objects of the invention by means of an equipment assembly which essentially includes a turbine type prime mover and compressor: preferably sharing a common power shaft but not essentially. Also present are suitable recouperative type heat exchangers, an electric power generation device and other state-of-the-art machinery as is to be subsequently apparent.

This mechanical equipment is integrated by a fluid circulation system carrying a polyatomic working fluid. Distinctively, such working fluids are characterized by a molecular structure that dissociates under heat to gaseous constituents that chemically recombine exothermally to the original molecular structure. Water and ammonia are two representative examples.

At a starting point of its lowest gaseous state, the working fluid is turbo compressed up to multiple atmospheres and delivered to a recouperative heat exchanger for receipt of recombining exothermic heat present in the turbo prime mover exhaust. From the recouperative heat exchanger, the ascendent working fluid is delivered to an external energy supply, such as a gas combustion appliance, or solar heater for additional heat input to elevate the working fluid energy level above the minimum dissociation point: thereby compounding the specific volume of the gaseous mixture from a molecular vapor to a dissociated, elemental gas mixture.

From the dissociated gas mixture state, the working fluid is expanded across a turbo prime mover connected mechanically to drive the turbo compressor, and a dynamo device such as an electric generator or alternator.

As turbo prime mover exhaust, the refrigerant is ducted to the recouperator heat exchange with the state ascending working fluid to exothermically yield recombination reaction heat as the working fluid returns to a gaseous state of the original molecular compound. Further cooling of the recombined gaseous working fluid to the initial temperature of condensation in a desuperheater device provides source heat for water or space heating. Additional space and water heat is derived from the release of latent heat as the working fluid condenses in the manner of a normal Rankine cycle.

From this thermodynamic cycle point, isenthalpic expansion of the working fluid results in a cold, two-phase fluid suitable for ambient heat absorption in evaporators for refrigeration, comfort cooling, dehumidification, or atmospheric water recovery. Thereafter, the cycle is repeated with the initial isentropic compression.

DESCRIPTION OF THE DRAWINGS

Relative to the drawings wherein reference characters are used to identify consistent thermodynamic stages and equipment in both Figures of the drawings.

DESCRIPTION OF PREFERRED EMBODIMENTS

Figure 1:
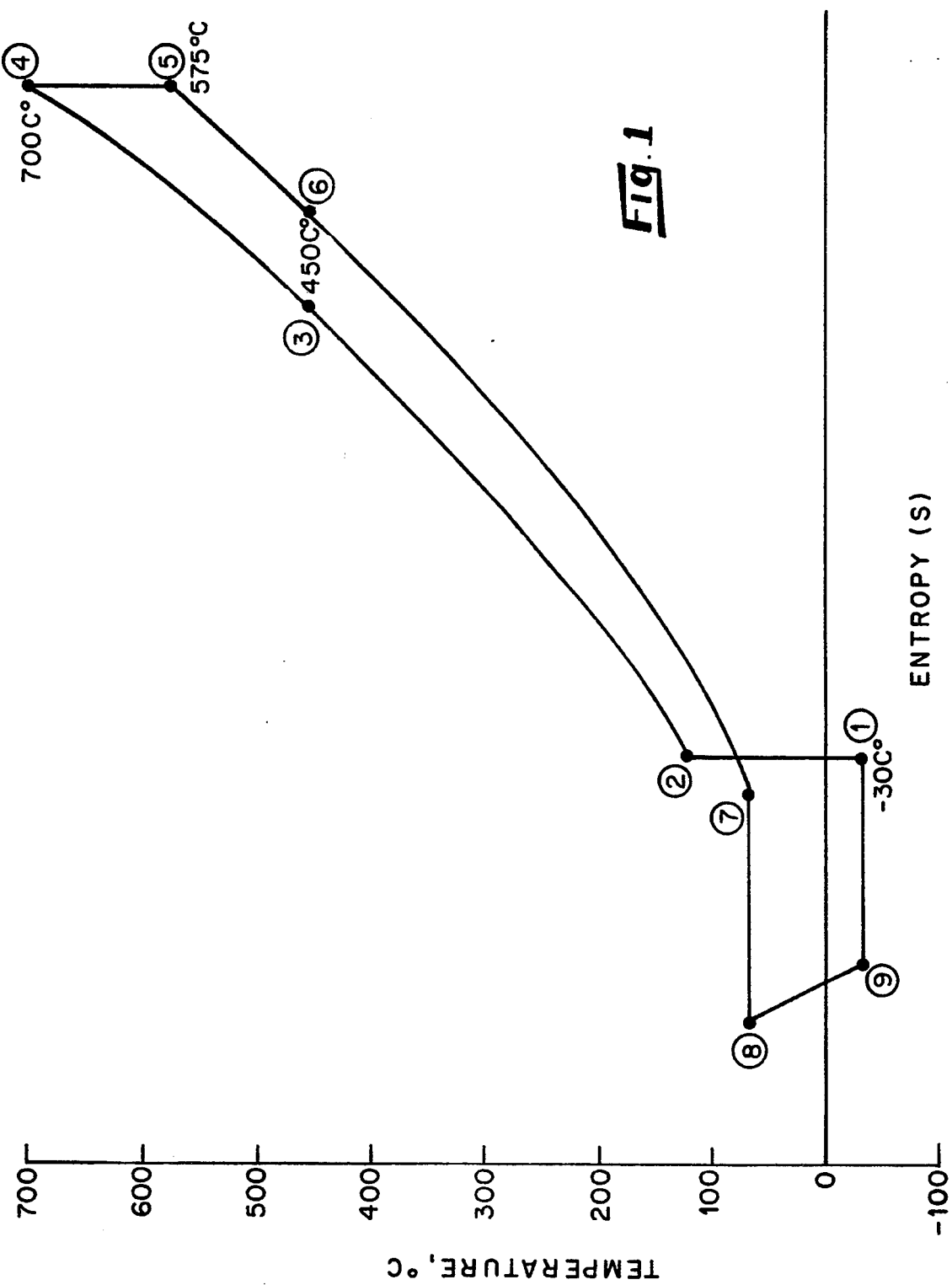
FIG. 1 is a Temperature-Entropy diagram of the present invention thermodynamic cycle; and, FIG. 2 is a fluid and process flow schematic of the present invention.
Figure 2:
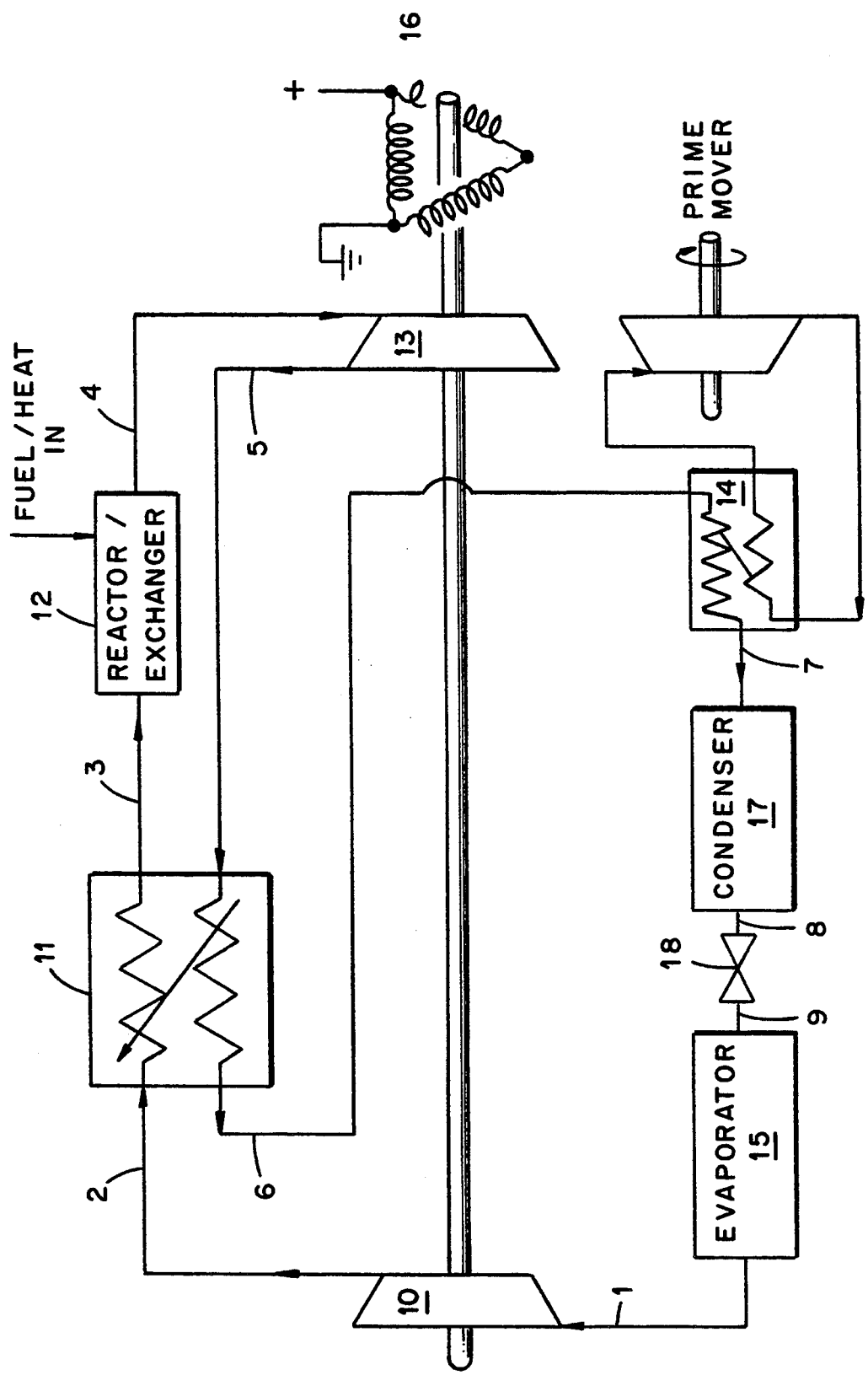

As previously described, the working fluid of this invention includes a molecular structure (for example, ammonia) which will dissociate from a gaseous, molecular vapor state to an elemental gas mixture state upon the addition heat as represented by the equation:

$$2NH_3 + Heat \rightarrow N_2 + 3H_2$$

Upon cooling, the refrigerant compounds chemically recombine exothermically to the original molecular state. Such reaction cycle may be assisted catalytically or chemically.

It should be further noted that it is not critical to the invention operation that the working fluid molecular structure entirely dissociates to the greater energy state. It may be sufficient that only one or two simple substances dissociate from a more complex structure such as a 2-propanol/acetone/hydrogen working fluid system represented by isopropylalcohol,

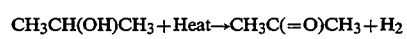

$$CH_3CH(OH)CH_3 + Heat \rightarrow CH_3C(=O)CH_3 + H_2$$

Relative to the Figures, the lowest energy state of the thermodynamic cycle is found at state point 1 which, with ammonia as the working fluid, corresponds to about 1 atmosphere, absolute, of pressure and a temperature of about −30° C. Isentropically compressed by a turbo compressor 10, the working fluid is energized to state point 2 at about 20 atmospheres, absolute, and about 120° C. From state point 2 to state point 3 the working fluid is heated across the low energy course of recouperator 11 to about 450° C. by heat exchange with a flow increment of working fluid passing from state point 5 to state point 6 which is the exhaust of the turbo prime mover 13.

Reactor heat exchanger 12 serving the state point 3–4 segment of the cycle represents a suitable heat source such as a furnace fueled by traditional sources such as coal or oil. However, suitable reactor appliance 12 may also be a solar furnace, nuclear heat cell, biomass methane furnace, or geothermal exchange. By whatever means of reactor 12 energy conversion, the working fluid is elevated to about 700° C. at state point 4 which is the highest energy state in the cycle. Over this 3–4 state point increment of the cycle, the working fluid is partially or wholly decomposed to chemically less complex constituents such as, in the case of ammonia, gaseous elemental nitrogen, $N_2$, and hydrogen, $H_2$. Such dissociation of ammonia represents a molar volume increase of from two to four. Potential, therefore, for turbine produced work is therefor enhanced as the gas expands therethrough from state point 4 at 700° C. and 20 atmospheres, absolute, to state point 5 at 10 to 12 atmospheres and 550–575° C. Representative uses of the work produced by turbine 13 are, first, to drive the turbo compressor 10 and, secondly, to drive an electric dynamo 16. There are many forms of electric power generation devices under the generic description of "dynamo:" representative, are generators and alternators.

From state point 5 to state point 6, the working fluid reactively recombines to the vapor phase of its more complex molecular structure: a reaction that may be assisted chemically or catalytically. This exothermic recombination reaction serves as a primary heat source for the recouperator 11 heat transferred to the ascendent cycle increment between state points 2 and 3. Some sensible heat is usually transferred, also.

From the recouperator high energy course exit at state point 6, the working fluid is substantially a high energy state molecular vapor that may be cooled through a desuperheater 14 to provide space or water heating in the exchange. Water heating between state points 6 and 7 may also include steam generation for more distributed turbo prime mover utility or even reciprocating engine operation.

At state point 7, the working fluid sensible heat is substantially ambient but the pressure is still 1 to 2 atmospheres. From state points 7 to 8, Rankine cycle condensation 17 may be exploited for low grade space and water heating.

Those of skill in the art will recognize that the temperature of Rankine cycle condensation between state points 7 and 8 strongly influences the type of energy conversion most efficiently extracted from the system. An decrease in the temperature of this cycle increment favors the efficiency of turbo prime mover operation and electrical or mechanical energy extraction. Conversely, an increase in the temperature of this cycle increment favors the relative quantity of energy available for fluid and space heating.

Isenthalpic expansion across valve 18 between state points 8 and 9 results in a cold, two-phase refrigerant that will absorb energy between state points 9 and 1 by means of a conventional evaporator 15. Such energy absorption is suitable for refrigeration, comfort cooling, dehumidification and atmospheric water recovery.

From state point 1, the cycle is repeated.

The data of Table 1 represents the invention capacity to absorb turbine utilized energy by comparing a corresponding quantity of ammonia vapor starting with a 1 kg total mass of 100% ammonia vapor and a like mass amount to the stoichiometric equivalent of 25 mole % nitrogen and 75 mole % hydrogen at the same temperature and pressure conditions. The Table 1 values represent the work performed by the respective compressible fluids undergoing ideal, isentropic expansion through a turbine. A final pressure of 11.8 atmos. abs. was chosen for the state point 5 condition after expansion through the turbine 13 because this pressure will allow condensation of the ammonia to the liquid state with a water cooled condenser.

Isentropic expansion of 1 kg of ammonia from about 20 atmos. abs. and 700° C. to about 11.7 atmos. abs. and 627° C. results in a net enthalpy change of 232 kilojoules per kilogram (kJ/kg). A similar isentropic expansion of one kg of a stoichiometric mixture of 25 mole % nitrogen and 75 mole % hydrogen from about 20 atmos. abs. and 700° C. to about 11.7 atmos. abs. give a working fluid temperature of 575° C. after the turbine expansion and a net enthalpy change of 450 kJ/kg. Approximately 218 kJ more energy is generated per kilogram of working fluid driven through the process if it can be converted entirely to elemental $N_2$ and $H_2$ at the turbine 13 inlet and back to $NH_3$ before the Rankine cycle condenser at state point 7.

TABLE 1

| Conditions | 1 kg 100% $NH_3$ Gas | 1 kg, 25 m % $N_2$ 75 m % $H_2$ |
|---|---|---|
| 700° C. | Enthalpy: 1805 kJ/kg | 2364 kJ/kg |
| 19.7 atmos. abs. | Entropy: 1.566 kJ/kg-°K. | 2.823 kJ/kg-°K. |
| 11.8 atmos. abs. | Enthalpy: 1573 kJ/kg | 1914 kJ/kg |
|  | Entropy: 1.565 kJ/kg-°K. | 2.824 kJ/kg-°K. |
|  | Temp: 627° C. | 575° C. |
| NET ENERGY AVAILABLE TO TURBINE | 232 kJ/kg | 450 kJ/kg |

This example illustrates the thermodynamic advantage of a working fluid that can be thermally or kineticly cycled between existence as a single compound and as a mixture of chemical constituents. Additionally, in the example given by Table 1, the specific volume of the $N_2-H_2$ mixture is greater than the pure $NH_3$ at conditions representing the inlet to the turbo prime mover 13. Such increased specific volume results in a more efficient turbine operation.

From another perspective, a decomposing/recombining working fluid has steeper isobars on a temperature—entropy plot at the decomposed condition where it is used to generate power from a turbine. The constituent mixture has a larger isobaric heat capacity than the pure (undissociated) working fluid and a greater specific volume at the same conditions of temperature and pressure.

As our invention,
We claim:

1. A method of transforming heat energy to useful work comprising the steps of:
   providing a closed circulation system for a working fluid which includes a turbo prime mover, a turbo compressor and a recuperative heat exchanger;
   charging said closed circulation system with a polyatomic working fluid having the cyclic property of at least partial dissociation from the gaseous state of a first molecular structure to the gaseous state of a second, less complex molecular structure and recombination;
   compressing a gaseous phase of said working fluid in said turbo compressor to a first, molecular, energy state;
   delivering said first, molecular, energy state working fluid to said recuperative heat exchanger to receive exothermic reaction heat and raise said working fluid to a second, molecular, energy state greater than said first;
   heating said second, molecular, energy state working fluid to a third energy state of at least partial dissociation;
   expanding said third energy state working fluid through a turbo prime mover;
   delivering working fluid exhaust from said prime mover to said recuperative heat exchanger for recombination reaction; and
   transferring exothermic heat from said recombination reaction to said first, molecular, energy state working fluid.

2. A method as described by claim 1 wherein said turbo prime mover is connected to drive a dynamo for the production of useful work.

3. A method as described by claim 1 wherein said polyatomic working fluid is $NH_3$.

4. A method as described by claim 1 wherein said polyatomic working fluid is $CH_3CH(OH)CH_3$.

5. A method as described by claim 1 wherein recombined working fluid from said recuperative heat exchanger is cooled by the transfer of energy in a desuperheater to a second working fluid for the production of useful work.

6. A system for transforming heat energy to useful work comprising:
   vapor compression means, a low energy course through recouperative heat exchange means, influx heat exchange means, turbo prime mover means and a high energy course through said recouperative heat exchanger means, all connected in the foregoing flow sequence by closed fluid conduit means; and
   a polyatomic working fluid within said conduit means having the cyclic property of at least partial dissociation from the gaseous state of a first molecular structure to the gaseous state of a second, less complex molecular structure and recombination.

7. A system as described by claim 6 wherein said high energy course through said recouperative heat exchange means includes exothermic recombination reaction conditions for said working fluid.

8. A system as described by claim 6 wherein said turbo prime mover is connected to drive said vapor compression means.

9. A system as described by claim 6 wherein said turbo prime mover is connected to drive dynamo means.

10. A system as described by claim 6 wherein said closed fluid conduit means connects Rankine cycle condenser means between said recouperative heat exchanger high energy course and said vapor compression means.

11. A system as described by claim 6 wherein said closed fluid conduit means connects isenthalpic evaporator means between said recouperative heat exchanger high energy course and said vapor compression means.

12. A system as described by claim 10 wherein said closed fluid conduit means connect isenthalpic evaporator means between said Rankine cycle condenser means and said vapor compression means.

* * * * *